United States Patent [19]

Lee et al.

[11] Patent Number: 5,082,639

[45] Date of Patent: Jan. 21, 1992

[54] SULFUR DIOXIDE REMOVAL FROM GASES USING A MODIFIED LIME

[75] Inventors: Yungli J. Lee, Pittsburgh; Lewis B. Benson, Coraopolis, both of Pa.

[73] Assignee: Dravo Lime Company, Pittsburgh, Pa.

[21] Appl. No.: 610,151

[22] Filed: Nov. 6, 1990

[51] Int. Cl.$^5$ ................. C01B 17/00; C01F 11/46
[52] U.S. Cl. .................... 423/242; 423/555
[58] Field of Search ............ 423/244 A, 243, 555, 423/242 A, 242 R

[56] References Cited

U.S. PATENT DOCUMENTS

| | | | |
|---|---|---|---|
| 783,570 | 2/1905 | Ellis et al. | |
| 1,277,855 | 9/1918 | Carson | |
| 1,579,766 | 4/1926 | Hite | |
| 2,044,553 | 6/1936 | Welch | 23/189 |
| 3,855,125 | 12/1974 | Lin | 210/46 |
| 4,464,353 | 8/1984 | Hains | 423/640 |
| 4,627,970 | 12/1986 | Kruger | 423/555 |
| 4,976,936 | 12/1990 | Rathi et al. | 423/555 |

OTHER PUBLICATIONS

Evaluations of Solids Dewatering for a Pilot-Scale Thiosorbic Lime SO$_2$ Scrubber: J. Chang and T. Brna, AIChE 1987 National Meeting, Houston, Tex. (Apr., 1987).
Calcium Sulfite Hemihydrate: Crystal Growth Rate and Crystal Habit: P. Tseng and G. Rochelle, Environmental Progress, 5 (1) pp. 5-11 (1986).
Effect of Wet Lime FGD Operating Conditions on Improving Particle Size and Dewatering of Sludge: F. Bazek et al.: Tenth Symposium on Flue Gas Desulfurization (Nov. 1986).
Gypsum Crystallizations for Limestone FGD; Chemical Engineering Progress, 82:51 (1986).
Improved Sludge Dewatering in Magnesium Enhanced Lime FGD Systems, Proceedings of the EPA/EPRI First Combined FGD and Dry SO$_2$ Control Symposium (1988).
Limestone Dissolution in Flue Gas Desulfurization Processes: G. Rochelle et al., EPA Cooperative Agreement R806251 (1983).

Primary Examiner—Gregory A. Heller
Attorney, Agent, or Firm—Armstrong, Nikaido, Marmelstein, Kubovcik & Murray

[57] ABSTRACT

A wet scrubbing process for removing sulfur dioxide from combustion gases uses an aqueous slurry containing calcium components resulting from the slaking of lime, with the slaked lime formed by mixing lime with water containing a calcium sulfur-oxide salt. The presence of the calcium sulfur oxide salt in the slaking water results in a more easily dewatered sludge that is subsequently removed from the wet scrubbing system.

8 Claims, 2 Drawing Sheets

SULFUR DIOXIDE REMOVAL FROM GASES USING A MODIFIED LIME

Field of the Invention

The present invention relates to a process for removing sulfur dioxide from combustion gases, using lime as a reactant in a wet scrubbing system, where the lime is modified during slaking to provide a process that enhances the dewatering properties of the aqueous calcium sulfite sludge removed from the scrubbing system.

BACKGROUND OF THE INVENTION

A commercially available process for removing sulfur dioxide from flue gases uses an aqueous slurry of lime, or other calcium component, preferably enhanced with magnesium, to scrub a countercurrent flow of the flue gases in a wet scrubbing unit. The lime, in removing sulfur dioxide from the flue gases, produces calcium sulfite, which is removed from the scrubbing system as a bleed stream of the scrubbing unit effluent. The bleed stream is passed to a clarifier or thickener and a thickened slurry or sludge separated from the aqueous media. The aqueous media is returned to the scrubber unit as a recycle stream, while the sludge is discharged from the scrubbing system and discarded, after further concentration, if desired. A problem that arises is the poor dewatering properties of the calcium sulfite sludge removed from the scrubbing system.

The poor dewatering properties of calcium sulfite sludges from lime scrubbing systems adds to the expense of operating such systems. Currently, only very limited improvements can be made, such as by the addition of sulfur, or thiosulfate, or polymeric flocculants to the system so as to improve the dewatering characteristics of the sludge. Another approach is to lower the solids content of the slurry to minimize secondary nucleation, but such is not feasible because of limitations owing to the design of the scrubbing system.

In magnesium-enhanced lime scrubbing processes, because of the high solubility of magnesium sulfite and its tendency to form ion pairs in solution, sulfite, not bisulfite, is elevated, while calcium is suppressed by adequate concentration of magnesium. Therefore, the scrubbing system is rich in alkalinity and gypsum scale does not form.

However, this process is known for producing a sludge that is difficult to dewater without applying forced oxidation, the sludge consists primarily of calcium sulfite and some coprecipitated calcium sulfate. It has been speculated by J. Chang and T. Brna, "Evaluation of Solids Dewatering for a Pilot-Scale Thiosorbic Lime $SO_2$ Scrubber, AIChE 1987 National Meeting, Houston, Tex. (April 1987), that magnesium causes deterioration of the dewatering properties of flue gas desulfurization (FGD) solid products. It was demonstrated by P. Tseng and G. Rochell, "Calcium Sulfite Hemihydrate: Crystal Growth Rate and Crystal Habit," Environmental Progress, 5 (1) pp 5-11 (1986), that a calcium sulfite hemihydrate crystal defect, caused by coprecipitated calcium sulfate, adversely affected the crystal habit and therefore settling and dewatering properties of the sludge. Low solids content was also suggested by F. Bazek et al. in "Effect of Wet Lime FGD Operating Conditions on Improving Particle Size and Dewatering of Sludge", Tenth Symposium on Flue Gas Desulfurization, November 17-21 (1986) and by L. Benson et al., "Improving Sludge Dewatering in Magnesium-Enhanced Lime FGD Systems", Proceedings of the EPA/EPRI First Combined FGD and Dry $SO_2$ Control Symposium, St. Louis, Mo., October (1988), to minimize secondary nucleation and therefore enhance average particle size. In addition, a double-drawoff crystallizer configuration, separating large particles from fine nuclei and sending only large particles to thickeners, seems promising to improve sludge dewatering properties, as suggested by J. Chang and T. Brna, "Gypsum Crystallization for Limestone FGD", Chemical Engineering Progress, 82:51 (1986).

Although intensive research activities have been conducted to improve sludge dewatering properties, the present inventors believe there are still some unexplored areas, for example, controlling nucleation at the dissolving lime surface by modifying the surface chemistry of lime or by modifying the way lime is introduced to the FGD system.

It is an object of the present invention to improve the dewatering properties of thickener underflow sludges from a lime scrubbing system and thus reduce the operating costs of such a system.

It is another object of the present invention to reduce the primary nucleation of calcium sulfite in a wet scrubbing system and increase the average particle size of the calcium sulfite, and make the dewatering of aqueous sludges from such a system easier to effect.

BRIEF SUMMARY OF THE INVENTION

An improved wet scrubbing process for removing sulfur dioxide from combustion gases, where the gases are contacted with an aqueous slurry containing calcium components, with slaked lime providing the calcium components, and where a portion of the scrubber effluent is clarified to remove calcium sulfite solids as an aqueous sludge, comprises adding a calcium sulfur-oxide salt to the water used to form the slaked lime. The lime for use in the scrubbing slurry is slaked in water containing between about 0.3 to 5.0 percent by weight of a calcium sulfur-oxide salt, based on the lime, which results in an increase in the average particle size of calcium sulfite solids produced and improved separation of the sludge removed from the system.

In preferred embodiments of the process, the calcium sulfur-oxide salt is calcium sulfite in a portion of the calcium sulfite solids from clarification of the effluent from the wet scrubber or, after the clarified effluent is filtered, or otherwise separated, separated calcium sulfite solids from the scrubbing system.

DESCRIPTION OF THE DRAWINGS

The invention will become more readily apparent from the following description of preferred embodiments of the process shown, by way of example only, in the accompanying drawings, wherein.

DETAILED DESCRIPTION

Figure 1:
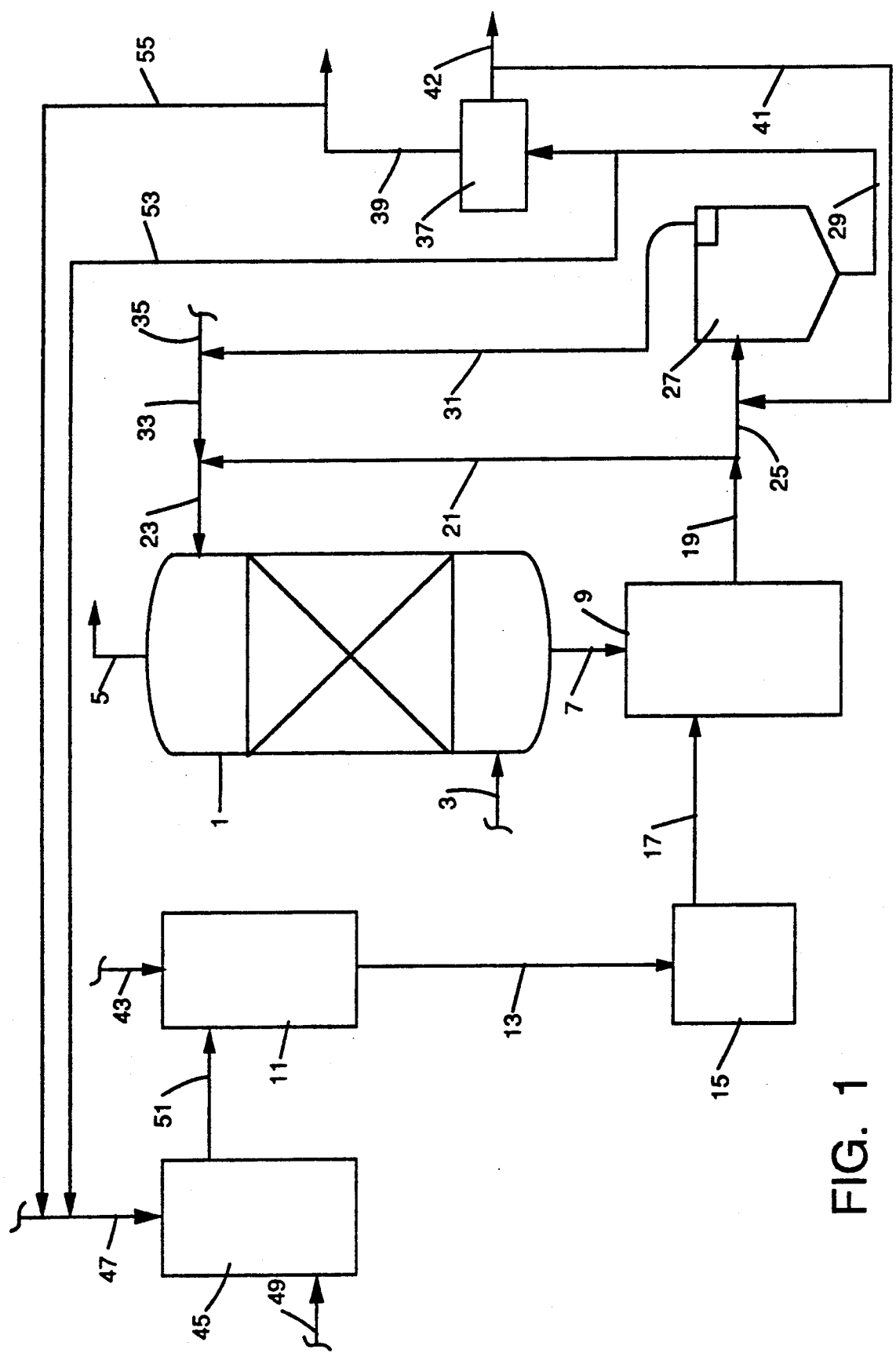
FIG. 1 is a flow diagram illustrating the presently preferred process of the present invention.

The present process is an improved process for removing sulfur dioxide from combustion gases in a wet scrubber, where calcium components are used to scrub the sulfur dioxide from the gases, the calcium components formed from slaked lime that is charged to the scrubber system.

The present process is especially useful where a scrubbing slurry is formed from calcium hydroxide and magnesium hydroxide, the magnesium hydroxide added in an amount to provide an effective magnesium ion content in the scrubbing tower of between about 2500 to 9000 parts per million. As known in the art, the effective amount of magnesium ion in such scrubbing media is that amount over and above the chloride ion content of the aqueous media present in the scrubbing unit. Since chloride ions tend to interfere with the affect of the magnesium ions present in the scrubbing solution, only those magnesium ions over and above that required to form magnesium chloride in the scrubbing unit are considered to be "effective" in the removal of sulfur dioxide from the flue gas.

Referring now to the drawing, which schematically illustrates the present process, a scrubbing system is illustrated. A wet scrubbing unit 1 has combustion gases containing sulfur dioxide charged thereto through line 3, which gases pass upwardly therethrough and are cleaned, with clean gases, with sulfur dioxide removed therefrom, discharged from the wet scrubbing unit 1 through outlet 5. As is conventional, an aqueous slurry, containing calcium components such as calcium hydroxide, countercurrently contacts the combustion gases in the wet scrubbing unit 1 and is passed by line 7 to a recycle tank 9. A calcium component, such as lime, from a lime slaker 11, is passed through line 13 to a slaked lime storage tank 15 and from there charged through line 17, as needed, to the recycle tank 9. A recycle of scrubbing effluent from the recycle tank flows through lines 19, 21 and 23 back to the wet scrubbing unit 1. Also, as is conventional, a bleed stream, or portion of the effluent from the scrubbing unit 1, from recycle tank 9 and line 19, containing calcium sulfite solids, is taken through line 25 to a thickener 27 where the aqueous effluent is clarified to remove calcium sulfite solids therefrom as sludge, which calcium sulfite is removed as an underflow through line 29, while clarified liquid is removed as overflow through line 31 for recycle through line 33 to line 23 and return to the scrubbing unit 1. Additional water, when needed in the scrubbing unit 1, may be provided through line 35 to line 33, if desired. The underflow from line 29 is passed to a separator 37, such as a filter or centrifuge, with calcium sulfite solids removed through line 39, and filtrate or separated liquor through line 41. The filtrate or liquor is returned to the system, such as by return by line 41 to line 25 to the thickener, while a purge stream may, if desired, be removed from line 41 through line 42. This system is known in the art and has been useful in removing sulfur dioxide from combustion gases.

In accordance with the present process, the aqueous slaked lime added to the aqueous scrubbing slurry is formed by mixing lime, preferably containing magnesium hydroxide in an amount to provide an effective magnesium ion content of between 2500 and 9000 parts per million in the scrubber unit, and water, with the water containing a calcium sulfur-oxide salt. As illustrated in the drawing, lime from a source (not shown) is charged through line 43 to the lime slaker 11. In a preparation tank 45, a supply of a calcium sulfur-oxide salt, such as calcium sulfite or calcium sulfate, is fed through line 47 and is mixed with water charged to the preparation tank 45 through line 49. The water containing the calcium sulfur-oxide salt is then fed through line 51 to the lime slaker 11 where it is used in the slaking of lime that is to be used in the aqueous scrubbing slurry in wet scrubbing unit 1.

The calcium sulfur-oxide salt which is added to the water for use in slaking the lime may come from various sources, but is preferably taken from the scrubbing system itself. For example, one source of calcium sulfite is the underflow in line 29 from the thickener 27. From line 29, the desired amount of underflow, containing calcium sulfite, can be directed through offtake line 53 and passed to line 47 for addition to the preparation tank 45. When the thickener underflow is used as a source of calcium sulfite, adequate dilution with fresh water would be required so as to prevent severe primary nucleation in the lime slaking. The amount of dilution with fresh water in preparation tank 45 would depend on the particular scrubbing process parameters, but dilution to about 50 to 200 times initial volume should suffice. Or, another source of calcium sulfur-oxide salt is the solids from separator 37, a portion of which, from line 39, can be directed through line 55 to line 47 for addition to the preparation tank 45.

EXAMPLE

As an example of the present invention, a lime slaking procedure was modified to change the surface chemistry of lime particles according to the present process. Calcium sulfite or calcium sulfate saturated water (up to 2.0 weight percent $CaSO_3 \cdot \frac{1}{2}H_2O$ or $CaSO_4 \cdot 2H_2O$ based on $Ca(OH)_2$ present), instead of regular water, was used in lime slaking. A water to lime ratio of 5:1 was used to slake a quicklime composed of 89% CaO, 6% MgO and 5% inerts. The inerts were removed by passing lime slurry through a 100 mesh screen. Regular water was then used to dilute the lime slurry to a desired concentration, which was 5% by weight. In a test unit for desulfurization, to assure a constant production rate of $CaSO_3 \cdot \frac{1}{2}H_2O$ and a consistent solids content in the scrubbing slurry for settling tests, a constant feeding rate of lime was set and the $SO_2$ flow rate was controlled to keep pH constant at a value of 7.0. A stream of scrubbing liquor was fed at 100 ml/min to a 5.5 liter reactor continuously for at least four hours to approach steady state operation. The composition of the liquors were varied to control the concentrations of $Mg^{++}$, $SO_3^=$, and $SO_4^=$. Calcium and magnesium were analyzed by EDTA titration. Sodium and chloride were not analyzed but reported as they were in the liquor. Sulfite was analyzed by iodometic titration while sulfate concentrations were obtained from charge balance calculation. Particle size distributions were measured. Settling rates were measured with a one-liter graduate cylinder at room temperature.

A series of experiments were performed to establish a controlled baseline to illustrate the effects of modified lime on sludge dewatering properties. The controlled experiments (Table 1, C-1 to C-4) were conducted by feeding 5 wt% regular lime at constant rates to absorb 3 SCFM flue gas containing 2000 ppm $SO_2$, 8.5% $O_2$ and the balance $N_2$. These controlled experiments were also designed to understand the individual affects of magnesium and total sulfite on particle sizes of calcium sulfite hemihydrate solid products.

TABLE I

| Experiments | C-1 | C-2 | C-3 | C-4 |
|---|---|---|---|---|
| Chemistry | | | | |
| $Na^+$ (mM) | 153.8 | 280.6 | 0 | 0 |

TABLE I-continued

| Experiments | C-1 | C-2 | C-3 | C-4 |
|---|---|---|---|---|
| $Ca^{++}$ (mM) | 2.1 | 1.2 | 10.0 | 1.7 |
| $Mg^{++}$ (mM) | 26.2 | 8.6 | 290.0 | 312.0 |
| $Cl^-$ (mM) | 28.5 | 40.5 | 400.0 | 340.5 |
| $SO_3^=$ (mM) | 11.5 | 42.9 | 10.8 | 76.0 |
| $SO_4^=$ (mM) | 80.5 | 92.0 | 90.0 | 70.0 |
| Particle Size ($\mu$) | 46.9 | 29.8 | 42.9 | 23.6 |

With low magnesium and low total sulfite (C-1), the average particle size of the solid product was extremely large, 46.9 microns. It should be emphasized here that the particles obtained in a bench scale test unit are usually larger than their full scale counterparts primarily because of the lack of mechanical shear and therefor the lack of secondary nucleation. Nevertheless, Table 1 shows clearly that instead of high magnesium (C-3) it is high total sulfite (C-2) that causes reduction in particle size although high magnesium and high total sulfite (C-4) might synergistically reduce the particle size of $CaSO_3 \cdot \frac{1}{2}H_2O$ and deteriorate sludge dewatering properties. It has been speculated that it was the "effective magnesium," the molar concentration of $Mg^{++}$ less two times of molar concentration of $Cl^-$, that deteriorates sludge dewatering properties (Chang and Brna, 1987, supra). However, the "effective magnesium" concentration is proportional to the sum of total sulfite and sulfate since $Mg^{++}$ is the major cation and $SO_3^=$, and $HSO_3^-$, and $SO_4^=$ are the major anion species in Mg-lime scrubbing liquor. The "effective magnesium" may significantly modify $CaSO_3 \cdot \frac{1}{2}H_2O$ crystal habit. However, the results shown in Table I indicate that the "effective magnesium" has little affect on $CaSO_3 \cdot \frac{1}{2}H_2O$ particle size. In addition, because of the comparable concentrations of sulfate in these controlled experiments, the results imply that high total sulfite concentration itself substantially reduces $CaSO_3 \cdot \frac{1}{2}H_2O$ particle size probably due to severe primary nucleation at the dissolving lime particle interface.

It was observed that a limestone dissolution rate was suppressed by high concentration of sulfate or total sulfite (Rochelle et al., "Limestone Dissolution in Flue Gas Desulfurization", EPA Cooperative Agreement R806251, 1983) pp. 38, 39, 42-44, although it could be predicted otherwise according to the following reactions:

$$CaCO_3 + HSO_3^- \rightarrow CaSO_3 + HCO_3^- \qquad (1)$$

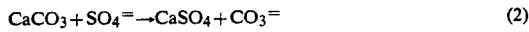

$$CaCO_3 + SO_4^= \rightarrow CaSO_4 + CO_3^= \qquad (2)$$

"Blinding effect" is a possible explanation. In other words, the fast reactions (1) or (2) facilitate $CaSO_3$ or $CaSO_4$ deposition on limestone surface. Mass transfer of $CaSO_3$ from solid side interface to the liquid side interface was therefore suppressed because of the coating "ash layer", $CaSO_3$ or $CaSO_4$ deposits.

The same principle can be applied to control line dissolution rate and therefore to control calcium concentration at dissolving lime particle surface. The bottom line is to control $CaSO_3$ relative saturation and therefore its primary nucleation. Deposition of $CaSO_3$ or $CaSO_4$ on a lime surface can be described by the following reactions:

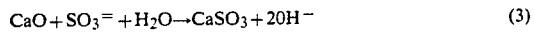

$$CaO + SO_3^= + H_2O \rightarrow CaSO_3 + 2OH^- \qquad (3)$$

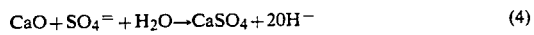

$$CaO + SO_4^= + H_2O \rightarrow CaSO_4 + 2OH^- \qquad (4)$$

Table 2 summarizes the results of the effects of modified limes on sludge dewatering properties according to the present process. All of these three experiments were performed in the presence of high magnesium and high total sulfite (C-4) in Table I.

TABLE II

| Experiment Lime | C-4 Regular | A Modified w/$CaSO_3 \cdot \frac{1}{2}H_2O$ | B Modified w/$CaSO_4 \cdot 2H_2O$ |
|---|---|---|---|
| Chemistry | | | |
| $Ca^{++}$ (mM) | 1.7 | 3.3 | 2.5 |
| $M^{++}$ (mM) | 312.0 | 305.0 | 295.9 |
| Cl (mM) | 340.5 | 340.0 | 340.0 |
| $SO_3^=$ (mM) | 76.0 | 56.6 | 63.5 |
| $SO_4^=$ (mM) | 70.0 | 84.5 | 68.0 |
| Particle size ($\mu$) | 23.6 | 36.0 | 37.8 |

Figure 2:
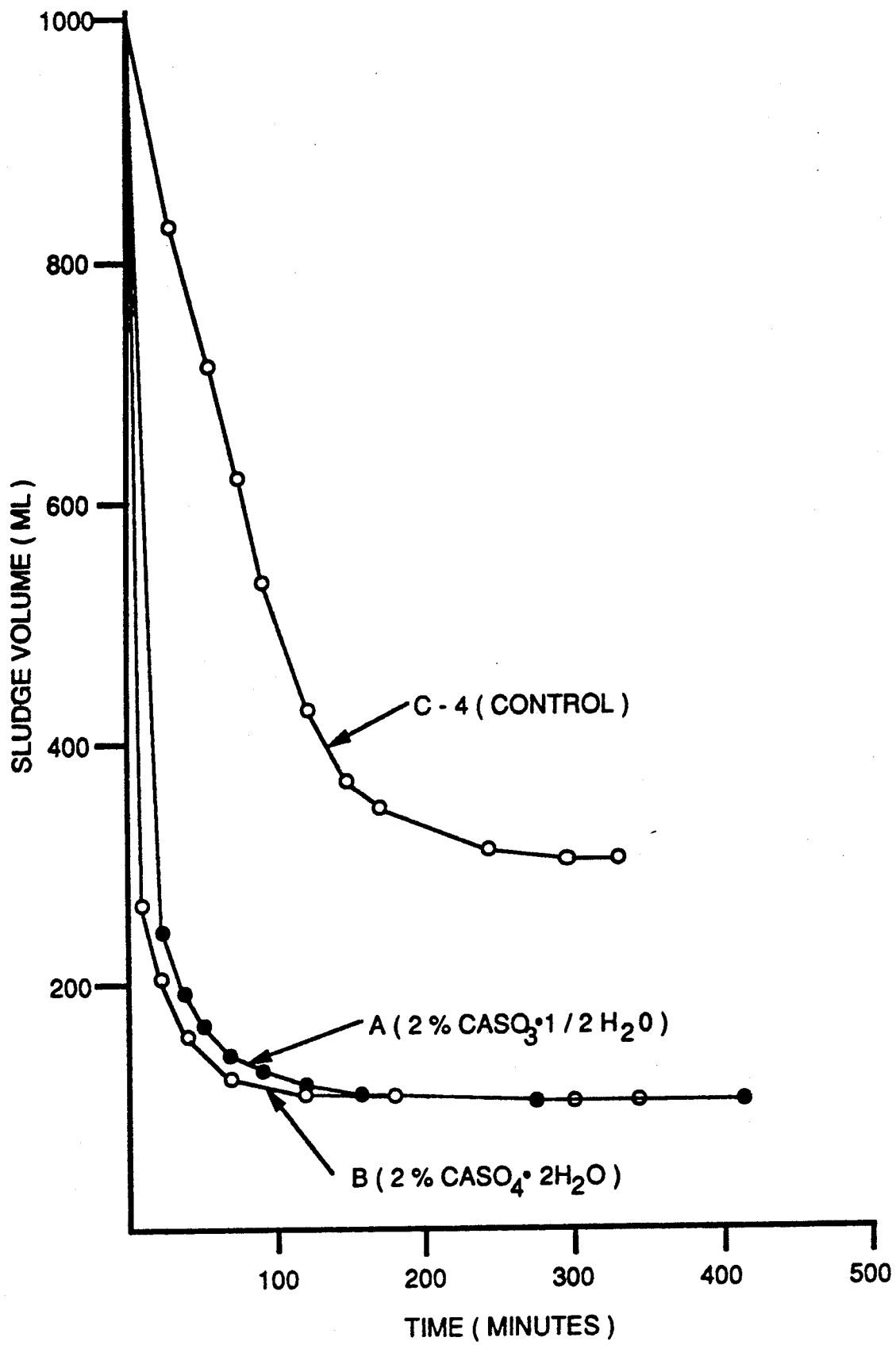
FIG. 2 is a graph illustrating the settling properties of sludges from the present process as compared with a sludge from a conventional scrubbing process.

The results show that both $CaSO_3$ (A) and $CaSO_4$ (B) modified limes (2% based on the lime) successfully increase average particle size of $CaSO_3 \cdot \frac{1}{2} H_2O$ crystal from 23.6 to 36.0 and 37.8 microns, respectively. FIG. 2 gives the settling test results of the final slurries of these three experiments. It shows clearly that sludes produced using the $CaSO_3$ (A) or $CaSO_4$ (B) modified lime settle much faster than the control sludge (C-4). Besides, the final sludge volumes, an indication of sludge dewatering property, of the sludges obtained from $CaSO_3$ or $CaSO_4$ modified lime are much smaller than the control sludge volume.

The process of the present invention, as illustrated, in Table II, provides an increase in the particle size from slightly above 20 microns to almost about 40 microns. In addition, the initial settling rate is increased, as illustrated in FIG. 2, about five fold, and the sludge volume, after settling overnight, decrease 50 percent. Optical microscopic examination showed that the crystal morphology changed.

Addition of the calcium sulfur-oxide salt in water must be made during slaking of the lime in the lime slaker 11. Addition of such a modifier to the slaked lime storage tank 15 was found not to provide the benefits of the present process.

What is claimed is:

1. In a process for removing sulfur dioxide from combustion gases by contacting the gases in a wet scrubbing unit with an aqueous scrubbing slurry, containing calcium components, for the removal of the sulfur dioxide, the calcium components provided in said slurry by adding aqueous slaked lime thereto, and a portion of the effluent from the scrubbing unit, containing calcium sulfite solids, is clarified to remove calcium sulfite solids therefrom as an aqueous sludge, the improvement wherein the aqueous slaked lime added to said scrubbing slurry is formed by mixing lime and water, with the water containing a calcium sulfur-oxide salt in an amount sufficient to provide between about 0.3 to 5.0 percent by weight of said calcium sulfur-oxide salt based on said lime, whereby the average particle size of calcium sulfite solids in said aqueous sludge is increased to provide improved separation of water of said aqueous sludge therefrom.

2. In the process as defined in claim 1, the improvement wherein said calcium sulfur-oxide salt is selected from the group comprising calcium sulfate and calcium sulfite.

3. In the process as defined in claim 1, the improvement wherein said calcium sulfur-oxide salt is calcium sulfite and said salt, for use in mixing of said lime and water, is provided by returning a portion of calcium sulfite solids from the clarification of said effluent.

4. In the process as defined in claim 1, the improvement wherein the calcium sulfite solids removed from said clarified portion of the effluent from the scrubbing unit are further separated from the aqueous media and said separated solids, containing calcium sulfite, returned for use in the mixing of said lime and water as said calcium sulfur-oxide salt.

5. In the process as defined in claim 1, the improvement wherein said aqueous slurry, containing calcium components for the removal of the sulfur dioxide, contains a magnesium ion content of between 2500 and 9000 parts per million in the wet scrubbing unit.

6. In a process for removing sulfur dioxide from combustion gases by contacting the gases in a wet scrubbing unit with an aqueous scrubbing slurry, containing calcium components, and a magnesium ion content of between 2500 and 9000 parts per million in the wet scrubbing unit, for the removal of the sulfur dioxide, the calcium components provided in said slurry by adding aqueous slaked lime thereto, and a portion of the effluent from the scrubbing unit, containing calcium sulfite solids, is clarified to remove calcium sulfite solids therefrom as an aqueous sludge, the improvement wherein the aqueous slaked lime added to said scrubbing slurry is formed by mixing lime and water, with the water containing a calcium oxide salt, selected from the group consisting of calcium sulfite and calcium sulfate, in an amount sufficient to provide between about 0.3 to 5.0 percent by weight of said calcium sulfur-oxide salt based on said lime, whereby the average particle size of calcium sulfite solids in said aqueous sludge is increased to provide improved separation of water of said aqueous sludge therefrom.

7. A process for removing sulfur dioxide from combustion gases by contacting the gases in a wet scrubbing unit with an aqueous scrubbing slurry, containing calcium components, and a magnesium ion content of between 2500 and 9000 parts per million in the wet scrubbing unit, for the removal of the sulfur dioxide, with a portion of the effluent from the scrubbing unit, containing calcium sulfite solids therefrom as an aqueous sludge comprising:

recovering a portion of said aqueous sludge containing calcium sulfite solids;

adding said recovered portion of aqueous sludge containing calcium sulfite solids to water to form a modifying solution;

adding a magnesium-containing lime to said modifying solution to form a modified aqueous slaked lime containing 0.3 to 5.0 percent by weight of said recovered calcium sulfite, based on said magnesium-containing lime; and adding said modified aqueous slaked lime to said wet scrubbing unit as said aqueous scrubbing slurry.

8. A process for removing sulfur dioxide from combustion gases by contacting the gases in a wet scrubbing unit with an aqueous scrubbing slurry, containing calcium components, and a magnesium ion content of between 2500 to 9000 parts per million in the wet scrubbing unit, for the removal of the sulfur dioxide, with a portion of the effluent from the scrubbing unit, containing calcium sulfite solids, clarified to remove calcium sulfite solids therefrom as an aqueous sludge, comprising:

recovering a portion of said aqueous sludge containing calcium sulfite solids;

separating said recovered portion to provide separated solids, containing calcium sulfite;

adding calcium sulfite, from the separated solids provided, to water to form a modifying solution;

adding a magnesium-containing lime to said modifying solution to form a modified aqueous slaked lime containing 0.3 to 5.0 percent by weight of said recovered calcium sulfite based on said magnesium-containing lime; and adding said modified aqueous slaked lime to said wet scrubbing unit as said aqueous scrubbing slurry.

* * * * *

UNITED STATES PATENT OFFICE
CERTIFICATE OF CORRECTION

PATENT NO. : 5,082,639
DATED : Jan. 21, 1992
INVENTOR(S) : Yungli J. Lee, et al

It is certified that error appears in the above-identified patent and that said Letters Patent is hereby corrected as shown below:

In Claim 6, at Column 7, line 29

Change "oxide" to read

---sulfur-oxide---

Signed and Sealed this

Third Day of August, 1993

Attest:

MICHAEL K. KIRK

Attesting Officer

Acting Commissioner of Patents and Trademarks